United States Patent [19]

Hirobe

[11] Patent Number: 4,941,712
[45] Date of Patent: Jul. 17, 1990

[54] BRAKE FLUID PRESSURE CONTROL APPARATUS IN AN ANTI-LOCK CONTROL SYSTEM

[75] Inventor: Yoshiaki Hirobe, Shiraoka, Japan

[73] Assignee: Akebono Brake Industry Co., Ltd., Saitama, Japan

[21] Appl. No.: 284,389

[22] Filed: Dec. 14, 1988

[30] Foreign Application Priority Data

Dec. 19, 1987 [JP] Japan .................. 62-336402

[51] Int. Cl.$^5$ .............................................. B60T 8/62
[52] U.S. Cl. ................................ 303/115; 303/113; 303/116; 303/119
[58] Field of Search ............... 303/116, 119, 115, 113, 303/114, 100, 117, 111

[56] References Cited

U.S. PATENT DOCUMENTS

| 3,782,786 | 1/1974 | Matsumara | 303/115 |
| 4,050,749 | 9/1977 | Harries et al. | 303/119 |
| 4,453,782 | 6/1984 | Arikawa et al. | 303/116 |
| 4,715,666 | 12/1987 | Farr | 303/117 |
| 4,762,376 | 8/1988 | Matsubara | 303/111 |
| 4,765,692 | 8/1988 | Miyake | 303/119 |

FOREIGN PATENT DOCUMENTS

| 2154227 | 5/1973 | Fed. Rep. of Germany | 303/119 |
| 2154806 | 5/1973 | Fed. Rep. of Germany | 303/119 |
| 0137253 | 6/1987 | Japan | 303/116 |
| 0078858 | 4/1988 | Japan | 303/116 |
| 1357286 | 12/1987 | U.S.S.R. | 303/116 |
| 2098292 | 11/1982 | United Kingdom | 303/114 |
| 2183763 | 6/1987 | United Kingdom | 303/113 |
| 2187521 | 9/1987 | United Kingdom | 303/114 |

Primary Examiner—Andres Kashnikow
Assistant Examiner—Matthew C. Graham
Attorney, Agent, or Firm—Oliff & Berridge

[57] ABSTRACT

A brake fluid pressure control apparatus comprises a fluid pressure control valve provided in a supply passage communicating a master cylinder with wheel cylinders, a stepped piston slidably fitted into the fluid pressure control valve and urged by a return spring in one direction toward a stop piston, a fluid pressure chamber provided in the central portion of the fluid pressure control valve in such a manner as to communicate with the supply passage, and a back pressure chamber provided in the other side of the stepped postion. The pressure fluid returned to the back pressure chamber at the time of a decrease of the pressure during anti-lock control is received by the stepped piston and is returned through a throttle portion to the master cylinder side, thereby relieving any kickback acting upon the brake pedal.

6 Claims, 1 Drawing Sheet

BRAKE FLUID PRESSURE CONTROL APPARATUS IN AN ANTI-LOCK CONTROL SYSTEM

BACKGROUND OF THE INVENTION

This invention relates to a brake fluid pressure control apparatus in an anti-lock control system for a vehicle, equipped with a mechanism for relieving a kickback which acts on a brake pedal during anti lock control.

A phenomenon called "kickback" has been known to occur during anti lock control by an anti-lock control system which serves to monitor and assess a wheel skid condition of a vehicle, and to increase or to decrease a brake fluid pressure applied to wheel cylinders or to hold the fluid pressure at a constant value. This kickback phenomenon occurs when a control signal causes a great volume of return-pressure fluid to flow from the wheel cylinders to a reservoir, thereby being returned to a pressure fluid supply passage which communicates a master cylinder with a pressure control valve. When this great volume of return-pressure-fluid acts on a pressure generating chamber of the master cylinder, the brake pedal is pushed back rapidly and strongly, thereby causing a driver to experience a disturbing or uncomfortable feeling.

U.S. Pat. No. 4,453,782, for example, discloses a fluid pressure control apparatus for an anti-lock control system that was conceived for the purpose of eliminating the above-mentioned kickback phenomenon. This fluid pressure control apparatus is equipped with a valve device (gate valve) which allows the pressure fluid from the master cylinder to be communicated with the pressure control valve when the fluid pressure exceeds a certain value. A discharge outlet of a hydraulic pump is connected to the pressure fluid supply passage between the valve device and the pressure control valve.

Since in this fluid pressure control apparatus the valve device hinders the flow of the return-pressure-fluid from the wheel cylinders into the master cylinder, a pressure accumulator for this return-pressure-fluid must be provided. However, the adding of the accumulator and the valve device at the discharge side of the hydraulic pump results in rather large-sized in the anti-lock control system.

Moreover, as the "kickback" does not occur in said apparatus, a driver does not realize that he is in a condition of anti-lock control.

SUMMARY OF THE INVENTION

It is accordingly an object of this invention to provide a brake fluid pressure control apparatus which is capable of relieving kickback and which can be made with a relatively small size. In accordance with this invention, there is provided a brake fluid pressure control apparatus of a type equipped with an electromagnetic valve device for controlling communication between a master cylinder and wheel cylinders through a supply passage and that between the wheel cylinders and a reservoir through a return passage, and a hydraulic pump for returning the brake fluid in said reservoir to said supply passage; said brake fluid pressure control apparatus comprising: a fluid pressure control valve provided in said supply passage between said master cylinder and said electromagnetic valve device; a stepped piston slidably fitted into said pressure control valve and urged in one direction toward a stop position by means of a return spring; a fluid pressure chamber formed at a central portion of said fluid pressure control valve in such a manner as to communicate with said supply passage; a back pressure chamber formed on the other side of said stepped piston in such a manner as to communicate with said hydraulic pump so that the return-pressure-fluid from said wheel cylinders, at the time of a decrease of the pressure during anti-lock control, pressurized by means of said hydraulic pump and introduced into said back pressure chamber to achieve a pressure accumulation therein by moving said stepped piston, and further comprising a return fluid passage for returning the return-pressure-fluid to the master cylinder side, said return fluid passage including a throttle portion.

When a decrease of the pressure occurs during anti-lock control, the return-pressure-fluid from the wheel cylinders is pressurized by a hydraulic pump and is introduced into said back pressure chamber, so that a pressure accumulation is achieved by moving of said stepped piston against the force of said return spring, and the return-pressure-fluid is returned to the master cylinder through the throttle portion. At the same time, the pressure fluid is returned to the master cylinder in an amount corresponding to the change in volume of said back pressure chamber, which change corresponds to the movement of said stepped piston. As a result of the above operation, the return-pressure fluid does not return to the master cylinder rapidly, thereby relieving the kickback acting on the brake pedal.

BRIEF DESCRIPTION OF THE DRAWINGS

The Figure is a sectional view of a system constituting an embodiment of a brake fluid pressure control apparatus equipped with a kickback relieving mechanism in accordance with this invention.

DESCRIPTION OF THE PREFERRED EMBODIMENT

Figure 1:
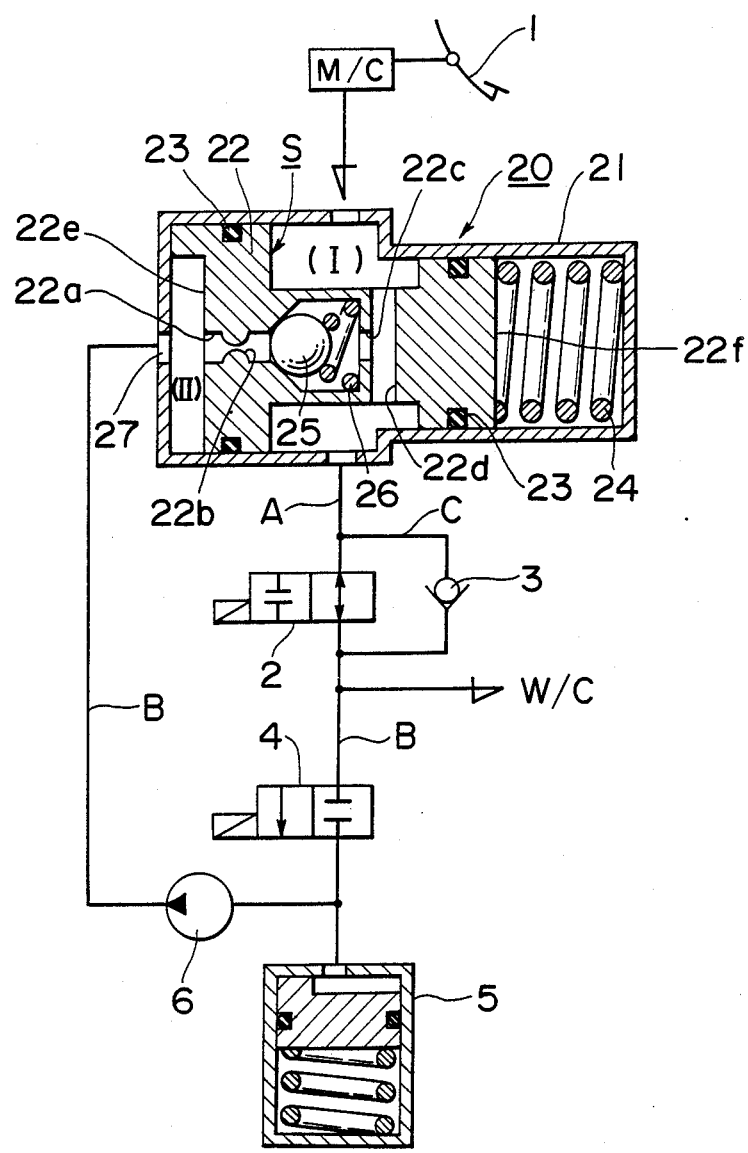

What characterizes this invention best is the fact that the return-pressure-fluid is received by the stepped piston in the pressure decrease phase during anti-lock control to achieve a pressure accumulation in the back pressure chamber and is returned to the master cylinder through the throttle portion, and that the pressure fluid is returned to the master cylinder in an amount corresponding to the change in volume of the fluid pressure chamber, which change corresponds to a movement of the stepped piston. Insofar these points are satisfied, it does not matter whether the fluid return passage which includes the throttle portion is provided in the stepped piston or elsewhere.

An embodiment of the brake fluid pressure control apparatus in accordance with this invention will now be described with reference to the attached drawing.

In the system shown in FIG. 1, pushing force applied to a brake pedal 1 is input to a master cylinder M/C through a push-rod. The fluid pressure generated in the master cylinder M/C is applied through a fluid pressure control valve 20 to wheel cylinders W/C in front and rear wheel brakes. A supply passage A between the master cylinder M/C and the wheel cylinders W/C communicates with a fluid pressure chamber (I) provided in the fluid pressure control valve 20. At the same time, an electromagnetic control valve 2 (hereinafter referred to as "hold valve") is connected between the fluid pressure control valve 20 and the wheel cylinders W/C. When a wheel skid condition has been assessed and controlled by an electronic control unit (not shown), a control signal causes the hold valve 2 to operate in such a manner as to cut off the supply passage A, thereby interrupting the pressure fluid supply from the master cylinder M/C to the wheel cylinders W/C. Further, a by-pass passage C that is routed around the hold valve 2 is connected to the supply passage A. The by-pass passage C includes a non-return valve for allowing the return of the return-pressure-fluid only from the wheel cylinders W/C to the master cylinder M/C.

The fluid pressure control valve 20 is composed of a housing 21 and a stepped piston 22 provided therein in such a manner as to be axially slidable.

The stepped piston 22 has at its ends a first end surface 22e with a relatively large area and a second end surface 22f with a relatively small area, the first end surface 22e receiving the return pressure fluid pressurized by a hydraulic pump 6. Since said second end surface is urged by said return spring 24, the stepped piston 22 is normally urged to the left as seen in the drawing, and the end of said stepped piston, which is on the opposite side with respect to the return spring, abuts against the inner wall of the housing 21. A fluid pressure chamber (I) is provided in the stepped piston 22 at an approximately central position with respect to the longitudinal direction thereof. Defined between the other end which is on the opposite side with respect to the return spring and the inner wall of the housing 21 is a back pressure chamber (II) which communicates with the pressure fluid chamber (I) through a fluid passage 22a serving as a return passage and a communicating throughhole 22c. The fluid passage 22a includes a throttle portion 22b with a small cross-section. A spherical check valve 25 is also provided, which enables the fluid passage 22a to be opened or closed. The check valve 25 is urged by a spring 26 to the left as seen in the drawing, i.e., toward the position in which it closes the fluid passage 22a.

On the other hand, a return passage B extending from the wheel cylinders W/C is connected to the fluid pressure control valve 20 and communicates with the back pressure chamber (II). The return passage B includes an electromagnetic control valve 4 (hereinafter referred to as "decay valve"). The decay valve 4 is operated to open by a control signal from the electronic control unit (not shown), as with the above-mentioned hold valve 2, allowing the return of the return-pressure-fluid from the wheel cylinders W/C to a reservoir 5. In other words, the reservoir 5 and the hydraulic pump 6 are provided in the return passage B extending from the discharge port of the decay valve 4, then the return-pressure-fluid returned to the reservoir 5 is pressurized by means of the hydraulic pump 6, and is supplied to the back pressure chamber (II) through an inlet 27.

Thus, the return-pressure-fluid pressurized by the hydraulic pump 6 is introduced into the back pressure chamber (II) to achieve a pressure accumulation therein, which means that the fluid pressure control valve 20 is also equipped with the pressure accumulation function of a conventional accumulator.

The operation of the embodiment will now be described. The pressure fluid generated in the master cylinder M/C by virtue of pushing force applied to the brake pedal 1 is supplied through the supply passage A, the fluid pressure chamber (I) of the fluid pressure control valve 20 and the hold valve 2 to the wheel cylinders W/C in the front and rear wheel brakes. In a state when at least one of the wheels starts to lock, the electronic control unit (not shown) monitors and assesses the skid condition and transmits a control signal to the hold valve 2 to interrupt the supply passage A. In synchronization with this, the decay valve 4 is operated by a control signal from the electronic control unit to open the return passage B, thereby allowing the pressure fluid in the wheel cylinders W/C to flow back to the reservoir 5. The pressure fluid returned to the reservoir 5 is then pressurized by means of the hydraulic pump 6, and is introduced into the back pressure chamber (II) of the fluid pressure control valve 20.

The return-pressure-fluid supplied to the back pressure chamber (II) pushes the check valve 25 open from the left and flows into the pressure fluid chamber (I) as it is squeezed by the throttle portion 22b. At this time, the stepped piston 22 is pressed from the left by the return-pressure-fluid and moves to the right against the force of the return spring 24, thereby changing the volume of the fluid pressure chamber (I). In other words, the return-pressure-fluid is gradually returned to the master cylinder M/C in an amount corresponding to the change in volume of the fluid pressure chamber (I).

As will be appreciated from the above, the fluid pressure control valve 20 is equipped with the function of an accumulator, for the return-pressure-fluid pressurized by the hydraulic pump 6 is supplied into the back pressure chamber (II) to achieve a pressure accumulation therein. At the same time, any change of the fluid pressure in the fluid pressure chamber (I) is fed back to the master cylinder M/C by stages each time, whereby the kickback acting upon the brake pedal 1 is relieved.

As described above, the brake fluid pressure control apparatus in accordance with this invention is so constructed that at the time of a decrease of the fluid pressure during anti-lock control, the return-pressure-fluid in the reservoir from the wheel cylinders is pressurized by means of the hydraulic pump and is introduced into the back pressure chamber (II) of the fluid pressure control valve to achieve a pressure accumulation corresponding to the movement of the stepped piston. Thus the pressure control valve functions as a conventional accumulator. Accordingly, the device in accordance with this invention needs no accumulator, which results in the ability to make the entire system smaller and thus reduce cost.

Further, the pressure fluid is returned to the master cylinder in an amount corresponding to any change in volume of the fluid pressure chamber (I) caused by movement of the stepped piston, whereby the kickback acting on the brake pedal can be relieved.

What is claimed is:

1. A brake fluid pressure control apparatus of a type equipped with an electromagnetic valve device for controlling communication between a master cylinder and wheel cylinders through a supply passage and communication between the wheel cylinders and a reservoir through a return passage, and a hydraulic pump for returning the brake fluid in said reservoir to said supply passage; said brake fluid pressure control apparatus comprising: a fluid pressure control valve provided in said supply passage between said master cylinder and said electromagnetic valve device; a stepped piston having a relatively large surface area at one end and a relatively smaller surface area at the other end slidably fitted into said pressure control valve and urged from the side of the small surface area by means of a return spring; a fluid pressure chamber formed between a stepped portion of said stepped piston and a housing of said fluid pressure control valve in such a manner as to communicate with said supply passage; a back pressure chamber formed at said one end of said stepped piston in such a manner as to communicate with said hydraulic pump so that a return-pressure-fluid from said wheel cylinders, at the time of a decrease of the pressure during anti-lock control, is pressurized by means of said hydraulic pump, is introduced into said back pressure chamber to achieve a pressure accumulation therein by moving said stepped piston against the force of said return spring, and is returned to the master cylinder in an amount corresponding to the change in volume of said fluid pressure which change corresponds to the movement of said stepped piston, and further comprising a return fluid passage and a check valve provided in said stepped piston for returning the return-pressure-fluid to the master cylinder, said return fluid passage including a throttle portion.

2. A brake fluid pressure control apparatus as claimed in claim 1, wherein said return fluid passage extends through said stepped piston.

3. A brake fluid pressure control apparatus as claimed in claim 1, wherein said return fluid passage passes through the fluid pressure control valve and connects the upstream side of the return passage with said master cylinder.

4. A brake fluid pressure control apparatus as claimed in claim 1 wherein a check valve adapted to set flow of the return-pressure-fluid in the forward direction is provided in said return fluid passage.

5. A brake fluid pressure control apparatus as claimed in claim 4, wherein said check valve has a spherical configuration and is normally urged by an urging spring in such a manner as to interrupt said return fluid passage.

6. A brake fluid pressure control apparatus as claimed in claim 1, wherein said electromagnetic valve device is composed of a normally open hold valve provided in said supply passage and a normally closed decay valve provided in said return passage.

* * * * *